Sept. 21, 1965     J. H. BOICEY     3,208,070
AUTOMOBILE WINDSHIELD OF LAMINATED GLASS
HAVING EMBEDDED ANTENNA WIRES
Filed Aug. 6, 1962     3 Sheets-Sheet 1

INVENTOR.
James H. Boicey
BY
Nobbe & Swope
ATTORNEYS

Sept. 21, 1965    J. H. BOICEY    3,208,070
AUTOMOBILE WINDSHIELD OF LAMINATED GLASS
HAVING EMBEDDED ANTENNA WIRES
Filed Aug. 6, 1962    3 Sheets-Sheet 2

INVENTOR.
James H. Boicey
BY
Nobbe & Swope
ATTORNEYS

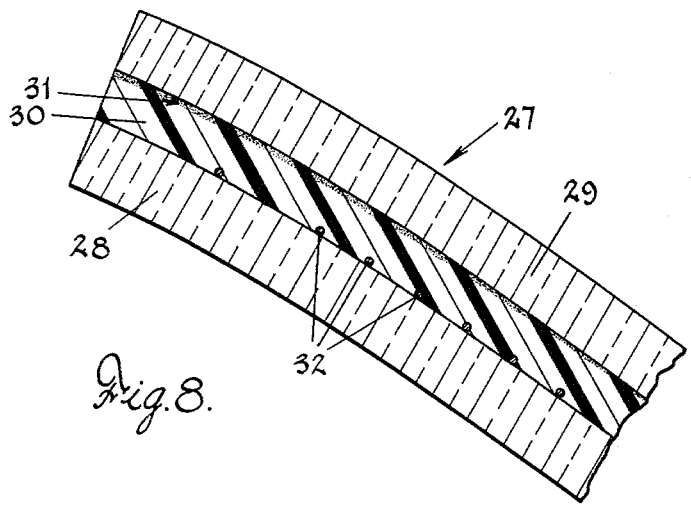
Fig. 8.
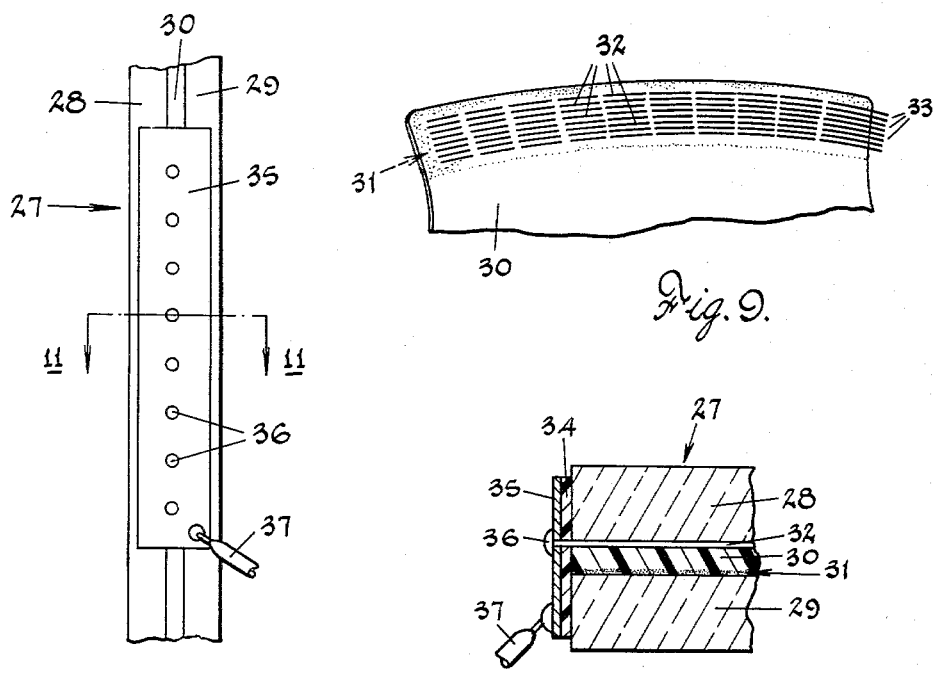
Fig. 9.
Fig. 10.
Fig. 11.
INVENTOR.
James H. Boicey
BY Nobbe & Swope
ATTORNEYS United States Patent Office 3,208,070
Patented Sept. 21, 1965

3,208,070
AUTOMOBILE WINDSHIELD OF LAMINATED GLASS HAVING EMBEDDED ANTENNA WIRES
James H. Boicey, Toledo, Ohio, assignor to Libbey-Owens-Ford Glass Company, Toledo, Ohio, a corporation of Ohio
Filed Aug. 6, 1962, Ser. No. 215,102
5 Claims. (Cl. 343—712)

This invention relates broadly to automobile windshields and more particularly to an improved windshield of laminated safety glass having a built-in radio antenna.

This application is a continuation-in-part of copending application Serial No. 11,249, filed February 26, 1960, now abandoned.

An important object of the invention resides in the provision of an automobile windshield equipped with a built-in antenna provided with radio connections mounted in secured relation to the windshield during the fabrication thereof.

Another object of the invention is to provide an improved antenna equipped windshield in which the means forming the antenna is substantially concealed from normal observation.

Another object of the invention is to provide a laminated safety glass windshield of the above character in which the antenna includes a plurality of relatively thin wires embedded in spaced relation to one another in the plastic interlayer of the windshield, and in which a terminal connection to the antenna is provided in a novel manner.

A further object of the invention is to provide a laminated windshield of the above character in which the antenna wires are disposed along the upper portion of the windshield and, in the event the plastic interlayer of the windshield is provided with a colored area, means is included for separating the wires from such colored area to reduce the degradation thereof during fabrication of the windshield when subjected to heat and pressure.

Other objects and advantages of the invention will become more apparent during the course of the following description when read in connection with the accompanying drawings.

In the drawings, wherein like numerals are employed to designate like parts throughout the same:

FIG. 8 is an enlarged cross-sectional view of an alternate embodiment of the invention;

FIG. 9 is a perspective view showing the location of the antenna wires in the alternate embodiment;

FIG. 10 is a fragmentary view of a portion of the edges of the assembled sheets of the alternate windshield; and FIG. 11 is a sectional view of the edge of the windshield taken substantially along line 11—11 of FIG. 10.

Figure 1:
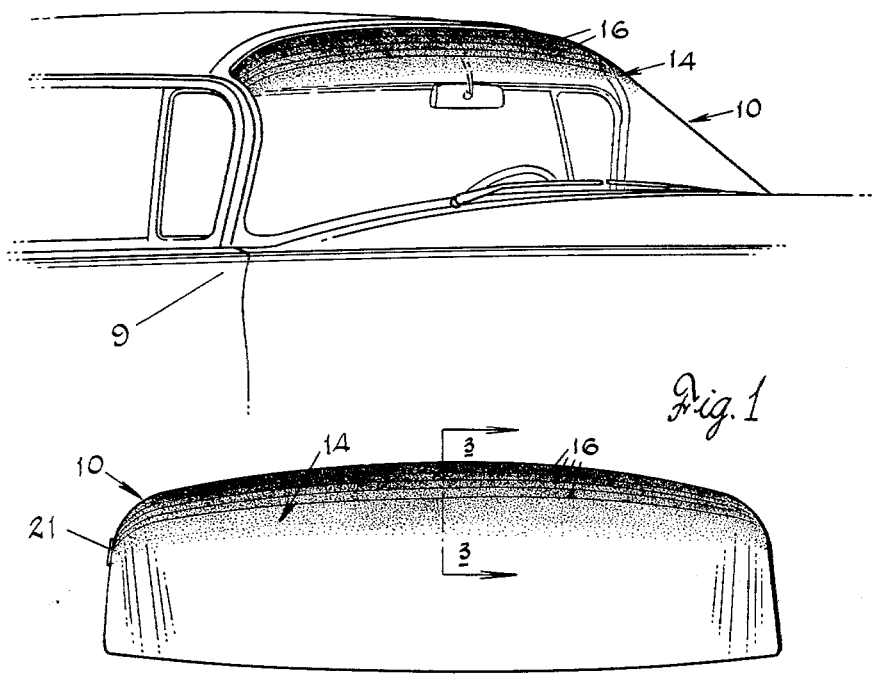
FIG. 1 is a perspective view of a windshield constructed in accordance with this invention and shown in its mounted position in an automobile.
Figure 2:
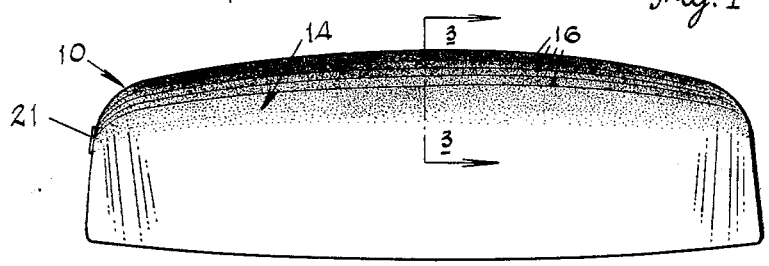
FIG. 2 is a plan view of the windshield.
Figure 3:
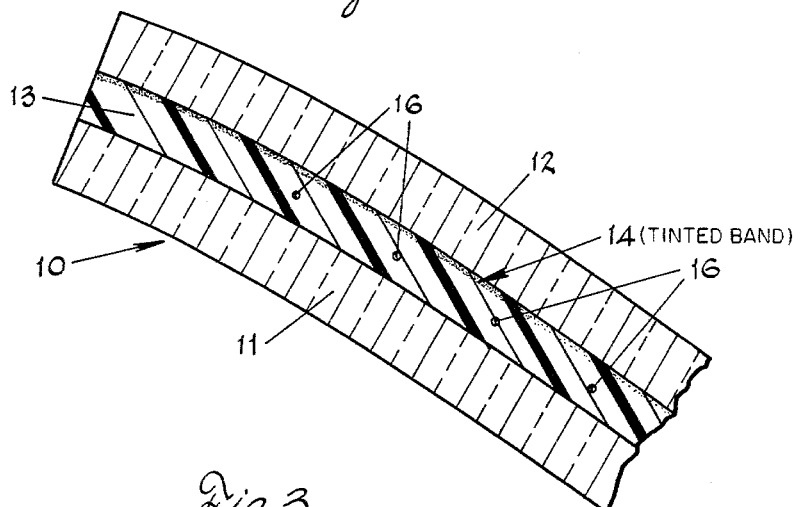
FIG. 3 is an enlarged cross-sectional view taken on line 3—3 of FIG. 2.

Referring now to the drawings and particularly to FIG. 1, there is shown the general outline of the forward end of an automobile 9 in which the windshield, generally designated by the numeral 10, is mounted. As disclosed in FIG. 3, the windshield 10 is of the laminated safety glass type and is formed of two sheets of glass 11 and 12 and an interlayer 13 of thermoplastic material, such as polyvinyl butyral resin. As is well known, a laminated safety glass windshield of this type is produced by assembling the glass sheets with the plastic interlayer interposed therebetween and then subjecting the assembly to heat and pressure in an autoclave to bond the laminations together. It is now customary for the upper marginal portion of the windshield to be provided with a horizontal colored area or band 14 as a protection for the occupants of the car from the glare of the sun or other overhead bright lights. While such a colored area may be produced by dip-dyeing the plastic, it is preferred to use a plastic sheet on one surface of which a colored band has been printed. The dyed portion of the plastic interlayer usually extends downwardly in gradually reducing intensity to a substantially horizontal fade-off line so as to refrain from causing undue eye fatigue resulting from a sharp line of demarcation between the dyed and undyed portions.

In fabricating the windshield, as provided by this invention, and before assembling the several sheets of glass and plastic, the antenna in the form of a plurality of very fine wires is secured to the plastic interlayer. The actual number of antenna wires employed will be determined by the requirements of the radio receiving unit, that is, by the length of antenna required to provide the receiving unit with the desired radio signals. It has been found that from four to eight such wires will generally provide a signal of sufficient strength for most purposes.

Figure 4:
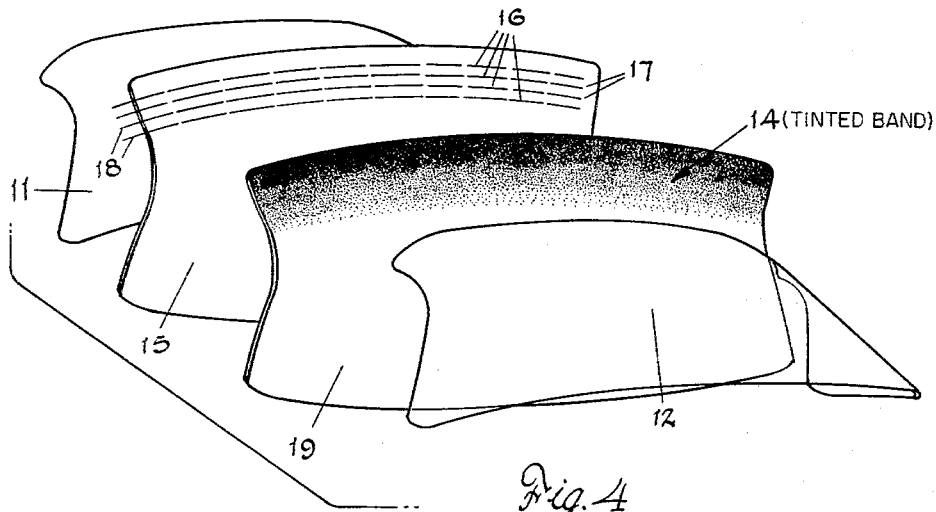
FIG. 4 is a perspective view of the component parts of the windshield.
Figure 5:
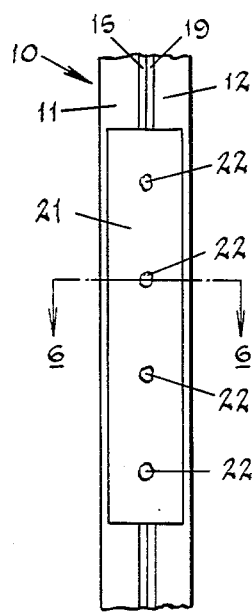
FIG. 5 is a fragmentary view of a portion of the edges of the assembled sheets of the windshield.

More particularly, two sheets or plies of plastic material are generally employed, although their combined thickness is usually no more than the thickness of the plastic interlayer conventionally used. Thus, a first sheet 15 of pattern-cut clear plastic material is provided with a plurality of wires 16 that are spaced inwardly from the upper edge of the sheet and extend in horizontally spaced parallel relation to one another. One end of each wire is spaced slightly inwardly from one edge of the plastic sheet, as at 17 (FIG. 4), while the other end of each wire is slightly extended beyond the opposite sheet edge, as at 18. One suitable type of wire is an alloyed magnetic wire having a layer of black nylon which is covered with a coating of polyvinyl butyral plastic. This wire and the coating thereon is relatively fine, being of approximately .003 to .006 of an inch diameter. When suitably arranged on the clear plastic sheet, the wires are temporarily adhered thereto by employed an electronic "tacking" to heat the plastic coating on the wire and the surface of the plastic sheet. This "tacking" operation is usually carried out at spaced points from the inwardly spaced ends 17 of the wires to a point adjacent the opposite edge of the sheet 15. For example, one arrangement which has been found particularly satisfactory includes eight wires of approximately .003 inch diameter spaced about 11/16 of an inch apart.

The plastic sheet 15, with the wires 16 adhered thereto, is then placed upon a sheet of glass 11 with the area in which the wires are located being superimposed over the area of the glass sheet that will be the upper portion of the windshield. The plastic sheet 19 with the dyed marginal portion 14 is then placed with the dyed portion superimposed over the area of the first plastic sheet 15 having the wires 16 thereon. Also, the wires 16 are provided on the surface of the plastic sheet 15 facing the plastic sheet 19 so that the wires are located between the two sheets of plastic.

As mentioned above, the colored band 14 is preferably printed on one surface of the plastic sheet 19 and, in such case, when the plastic sheet 19 is laid in surface contact with the plastic sheet 15, the dye printed surface of the sheet 19 will face outwardly or away from the sheet 15 so that it will not be contacted by the wires 16. This is important because, although the wires are very fine, they will become heated during the subsequent laminating operation and act to destroy the uniformity of the dyed or colored band 14. By separating the wires from the outwardly directed dyed surface of the plastic sheet 19, the thickness of the plastic material therebetween serves to eliminate such a possibility. The second sheet of glass 12 is then placed on the second plastic sheet 19.

Figure 6:
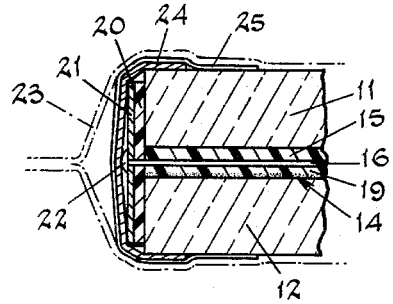
FIG. 6 is a cross-sectional view taken on line 6—6 of FIG .5.

Before proceeding with the actual laminating operation, any excess plastic projecting beyond the edges of the glass sheets 11 and 12, in the vicinity of the wire ends 18, is carefully removed. These ends of the wires 16 are then threaded through small aligned holes provided in a strip of plastic 20, such as polyvinyl butyral resin, and in a thin metal strip 21, which may be of copper or other suitable metal. Each wire 16 is soldered to the outwardly directed surface of the metal strip 21, as at 22, and the remaining length cut therefrom substantially flush with the surface of the strip as indicated in FIG. 6. As seen in this figure, the widths of the plastic and metal strips are preferably slightly less than the actual thickness of the windshield.

The assembly is then bonded together by heat and pressure to form a composite structure. It has been found preferable to prepare the assembly for this operation by placing the same in a plastic bag, as indicated by broken lines 23 in FIG. 6, which is evacuated and then sealed. By placing the several sheets of the assembly under vacuum, any entrapped air or moisture is withdrawn from between the sheets and a preliminary pressing of the sheets together is obtained. However, before the sheets are put into the bag, a holding clip 24, as of cardboard, is bent about the strips 20 and 21 and temporarily secured to the adjacent margins of the glass sheets 11 and 12 by strips 25 of moisture-proof adhesive material. This firmly positions the strips 20 and 21 on the edges of the glass sheets and with the plastic strip 20 in intimate contact with the edges of the plastic sheets 15 and 19.

The evacuated bag with the assembly therein is then placed in a liquid autoclave and subjected to heat and pressure to bond the glass and plastic sheets into a composite structure. During the bonding of the laminations together under heat and pressure in the autoclave, the antenna wires will naturally absorb some of this heat. However, since the dyed surface of the plastic sheet 19 is out of direct contact with the wires, the heat thereof will not be sufficient to adversely affect the colored area. Simultaneously with the bonding of the glass-plastic laminations together, the metal strip 21 will be bonded to the edges of the glass sheets and the plastic interlayer through the intermediary of the plastic strip 20. Upon removal of the laminated windshield from the bag after completion of the autoclaving operation, the adhesive strips 25 and holding clip 24 are removed from about the metal strip 21.

Figure 7:
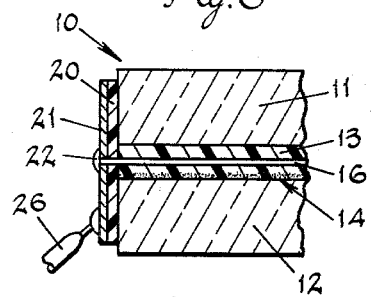
FIG. 7 is a cross-sectional view of the completed windshield.

Accordingly, the windshield 10 is provided with a built-in antenna for an automobile radio, and before its installation in the framing of the car body, a lead wire 26 can be secured, as by soldering, to the metal strip 21 as indicated in FIG. 7. Also, since the plastic and metal strips 20 and 21 respectively are relatively thin, it has been found in normal handling that they are not subject to being easily torn from the edge of the windshield.

In the alternate embodiment of the invention shown in FIGS. 8 through 11, a laminated windshield 27 is formed of two sheets of glass 28 and 29 and a single sheet or interlayer 30 of thermoplastic material. A colored band 31 is printed on one surface of the sheet 30 across the upper marginal portion thereof similar to the band 14 on the plastic sheet 19.

In assembling the windshield of FIGS. 8 through 11, a plurality of antenna wires 32 are secured to the surface of the plastic interlayer 30 opposite the colored band 31 in spaced, substantially parallel relation, with one of their ends spaced slightly inwardly from the edge of the sheet and their other end extending slightly beyond the opposite edge as at 33 (FIG. 9). The plastic interlayer is then inserted between the glass sheets 28 and 29, and the ends 33 of the antenna wires are threaded through aligned holes in a plastic strip 34 and a thin metal strip 35. Each wire 32 is soldered to the outer surface of the metal strip 35 as at 36, and any excess wire is removed as indicated in FIG. 11, after which the assembly is laminated according to the procedure outlined above for the windshield employing two sheets of thermoplastic material in the interlayer. Since the antenna wires 32 are secured to the surface of the interlayer opposite the colored band 31, they are separated from the colored band by the thickness of the plastic material and will not act to destroy or damage the uniformity thereof during laminating. Prior to mounting the laminated windshield in an automobile, a lead wire 37 is secured to the metal strip 35.

Since, according to the present invention the antenna wires are contained within the windshield, they are not susceptible to weathering, or breakage, and require no special mounting to attach the antenna on the body of the automobile. Further, by locating the antenna wires behind the shaded portion of the windshield, they will be out of the normal line of vision of the driver and also not apparent to casual observation.

It is to be understood that the form of the invention herewith shown and described is to be taken as a preferred embodiment of the same, but that various changes in the shape, size and arrangement of parts may be resorted to without departing from the spirit of the invention.

I claim:

1. An automobile windshield comprising two sheets of glass and an interposed layer of thermoplastic material bonded to one another, the interposed layer of thermoplastic material having a colored band applied to one surface thereof to provide a shaded area across the upper edge of the windshield, a plurality of antenna wires located between the glass sheets and spaced from the surface of the layer of thermoplastic material having the colored band applied thereto, said antenna wires extending in spaced, substantially parallel relation across the upper portion of the windshield in the shaded area thereof, and a metal plate secured to one edge of the windshield for connecting the wires together and to a radio receiving unit.

2. An automobile windshield comprising two sheets of glass and an interposed layer of thermoplastic material bonded to one another, said plastic interlayer comprising two sheets of plastic, one of said plastic sheets being provided with a colored area applied to one surface thereof, a plurality of antenna wires spaced from one another and secured between the two sheets of plastic opposite the colored area, with the colored surface of the one plastic sheet being remote from the other sheet and out of contact with said wires, and a metal plate secured to one edge of the windshield for connecting the wires together and to a radio receiving unit.

3. An automobile windshield comprising two sheets of glass and an interposed layer of thermoplastic material bonded to one another, said interposed layer of thermoplastic material having a colored band applied to one surface thereof to provide a shaded area across the upper edge of said windshield, a plurality of antenna wires located between said sheets of glass and spaced from the surface of said layer of thermoplastic material having the colored band applied thereto, said antenna wires extending in spaced, substantially parallel relation across the upper portion of said windshield in the shaded area thereof, said antenna wires having one of their ends spaced inwardly from the adjacent edge of the windshield and their opposite ends projecting beyond the opposite edge of said windshield, and a metal plate to which the projecting ends of said wires are secured for connecting the wires together and to a radio receiving unit, said metal plate being bonded to said opposite edge of the windshield by a layer of plastic material interposed between said plate and said opposite edge.

4. An automobile windshield comprising two sheets of glass bonded to one another by a thermoplastic interlayer, said interlayer comprising two sheets of thermoplastic material, one of said thermoplastic sheets having a colored band applied to the surface thereof adjacent one of said glass sheets to provide a shaded area across the upper edge of said windshield, a plurality of spaced, substantially parallel antenna wires located between said thermoplastic sheets across the upper portion of the windshield in the shaded area thereof, said antenna wires terminating at one of their ends inwardly from the adjacent edge of the windshield and projecting outwardly at their other end beyond the opposite end of said windshield, and a metal plate to which the projecting ends of the antenna wires are secured for connecting said wires together and to a radio receiving unit, said metal plate being bonded to said opposite edge of the windshield by a layer of plastic material interposed between said plate and said opposite edge.

5. An automobile windshield as defined in claim 4, wherein the width of said metal plate is less than the thickness of said windshield, and the projecting ends of said antenna wires extend through aligned openings in the plastic layer and the metal plate and are soldered to the outwardly directed surface of said metal plate.

References Cited by the Examiner

UNITED STATES PATENTS

| | | | |
|---|---|---|---|
| 1,223,583 | 4/17 | Hitchcock | 161—196 |
| 1,473,029 | 11/23 | Faubert | 343—712 |
| 2,329,634 | 9/43 | McDonald | 343—873 |
| 2,609,269 | 9/52 | Ryan | 161—409 |
| 2,944,926 | 7/60 | Gaiser | 343—704 |

FOREIGN PATENTS

| | | |
|---|---|---|
| 108,096 | 7/39 | Australia. |
| 647,665 | 12/50 | Great Britain. |

HERMAN KARL SAALBACH, *Primary Examiner.*